March 4, 1941.    W. ERNST ET AL    2,233,521

DOUBLE-ACTING CHECK VALVE DEVICE

Filed June 15, 1937

INVENTORS
WALTER ERNST,
GEORGE M. GEIGER.

BY Toulmin & Toulmin
ATTORNEYS

Patented Mar. 4, 1941

2,233,521

UNITED STATES PATENT OFFICE 2,233,521

DOUBLE-ACTING CHECK VALVE DEVICE

Walter Ernst and George M. Geiger, Mount Gilead, Ohio, assignors to The Hydraulic Press Corporation, Inc., Wilmington, Del., a corporation of Delaware Application June 15, 1937, Serial No. 148,339

2 Claims. (Cl. 121—38)

This invention relates to hydraulic machinery, and in particular, to hydraulic motors having automatically operative by-passing means associated therewith.

One object of this invention is to provide a hydraulic motor having an automatic by-passing device for by-passing the flow of fluid from one side of the motor to the other when the piston thereof reaches a predetermined position.

Another object is to provide a hydraulic motor having a check valve within the piston thereof, and automatically operated to permit fluid to by-pass through the piston when the piston reaches a predetermined position.

Another object is to provide a hydraulic motor having means for by-passing fluid through the piston when the piston reaches a predetermined position on its forward and return strokes.

Another object is to provide a hydraulic motor having check valve means associated therewith, and responsive to the change of position of the piston of the motor to open and permit fluid to by-pass around the piston head of the motor.

Another object is to provide a hydraulic motor and check valve means interconnecting the opposite ends of the motor, together with mechanical means engaged by the piston of the motor at predetermined positions to unseat the check valve means, and permit fluid to by-pass around the piston head from one end of the cylinder to the other.

In general, the hydraulic check valve device of this invention consists of a hydraulic motor having a cylinder with ports at its opposite ends, and a piston reciprocable therein. Associated with the piston, either within the piston head or outside of the cylinder, is a check valve, together with means for unseating the check valve when the piston reaches one or more predetermined positions. In the device shown in Figure 1 the check valve is located in the piston head, and unseated when it reaches a position at one end of its stroke. The device shown in Figure 2 also has a check valve in the piston head, but provides means for unseating the check valve at both ends of its stroke. The device shown in Figure 3 has a check valve entirely outside of the cylinder, with a mechanical linkage operated by the motor piston when the latter reaches predetermined positions in its stroke, thereby unseating the check valve.

Figure 1:
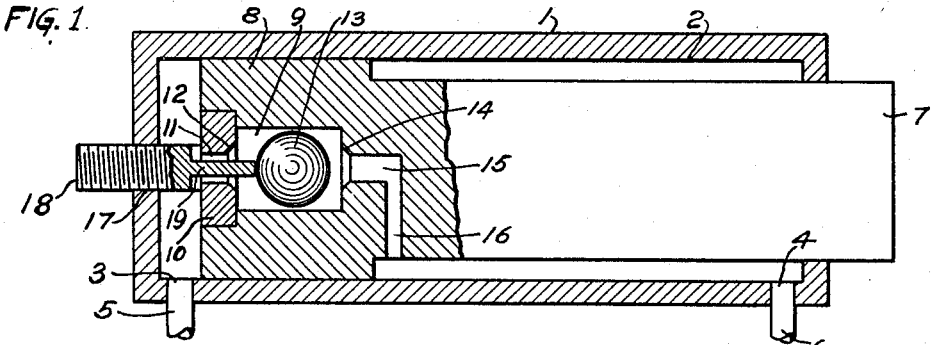
Figure 1 is a central vertical section through the hydraulic motor and check valve of the present invention, showing the check valve unseated at one end of the stroke of the piston.

Referring to the drawing in detail, Figure 1 shows a cylinder 1, having a bore 2 with ports 3 and 4 at its opposite end, and connected to the pipes 5 and 6, respectively. The cylinder bore 1 contains a piston 7 having a piston head 8 reciprocable therein. The piston head 8 is of a double-acting type, and is provided with an internal bore 9, closed by a disc 10 having an aperture 11 and a valve seat 12. Within the bore 9 is arranged a ball check element 13, adapted to seat in the valve seat 12. At the opposite end of the bore 9 a valve seat 14 is provided, from which runs the angular passageway 15, leading to the outlet 16 at the opposite side of the piston head 8. The cylinder 1, at one end, is provided with a threaded bore 17, within which is mounted a threaded member 18, having a projecting portion 19 adapted to pass loosely through the aperture 11 and leave a space around the projecting portion 19 for the passage of fluid.

In the operation of the device shown in Figure 1, to cause a forward stroke of the piston 7, pressure fluid is admitted from a suitable source through the pipe 5 and port 3, to the space on the left-hand side of the piston head 8. This fluid passes through the aperture 11 and into the bore 9, where it pushes the ball 13 against the seat 14, closing the entrance to the passageway 15. The fluid thus trapped in the cylinder 1, to the left-hand side of the piston head 8, pushes the piston head 8 to the right until the piston 7 is engaged by a stop or by the workpiece, or in some other manner is halted at the end of its forward stroke. The fluid displaced from the space to the right of the piston head 8 escapes through the port 4 and pipe 6.

When the direction of the pressure fluid is reversed so that it now enters through the pipe 6 and port 4, this fluid passes through the opening 16 and passageway 15, into the bore 9, pushing the ball 13 against the seat 12 and closing the aperture 11. The fluid thus trapped on the right-hand side of the piston head 8, pushes the latter to the left until the projecting portion 19 passes through the aperture 11, and unseats the ball 13 from the seat 12. When this occurs the fluid is enabled to pass from the pipe 6, through the cylinder bore 2, the angular passageway 15, the bore 9 and aperture 11, into the left-hand end of the cylinder 1, from whence it escapes through the port 3 and pipe 5. In this manner the pressure fluid is by-passed through the piston head when the latter arrives at a predetermined position in one direction of its stroke. By rotating the threaded member 18, the projecting portion 19 may be advanced or retracted, thereby changing the position at which the ball 13 becomes unseated and by-passing occurs.

Figure 2:
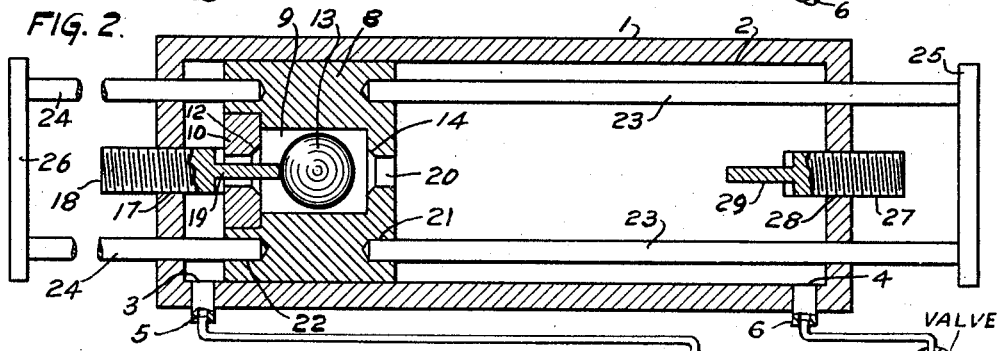
Figure 2 is a view similar to Figure 1, but showing a modified construction in which the check valve is unseated at both ends of the stroke of the piston.

The arrangement shown in Figure 2 provides a cylinder with ports and pipes as in Figure 1. The piston head 8, however, is provided with a straight passageway 20 in place of the angled passageway 15. Secured within the sockets 21 and 22, on opposite sides of the piston head 8, are connecting rods 23 and 24, secured to platens 25 and 26, respectively. The left-hand end of the cylinder 1 contains a threaded member 18 in the threaded bore 17, having a projecting portion 19, as before. The opposite end of the cylinder 1, however, now has a similar threaded member 27, mounted in a threaded bore 28 and having a projecting portion 29.

In the operation of the modification shown in Figure 2, the action is similar to that explained above, in connection with Figure 1. The pressure fluid entering from the pipe 6 and port 4 first urges the ball 13 against the seat 12, and thereafter causes the piston head 8 to move to the left until the projecting portion 19 unseats the ball 13, as shown in Figure 2. When the direction of the fluid is reversed so that pressure fluid now enters from the pipe 5, through the port 3, the ball 13 is first seated against the seat 14 and thereafter the piston head 8 is forced to the right until the projecting portion 29 passes through the passageway 20 and again unseats the ball 13. In the arrangement shown in Figure 2, therefore, the ball of the check valve is unseated at the opposite ends of its strokes, and the fluid is by-passed at the end not only of the return stroke but also of the forward stroke as well. The connecting rods 23 and 24 convey the force from the piston head 8 to the platens 25 and 26. The positions at which the projecting portions 19 and 29 become operative to unseat the ball 13 may be varied, as desired, by rotating threaded members 18 and 27, respectively.

Figure 3:
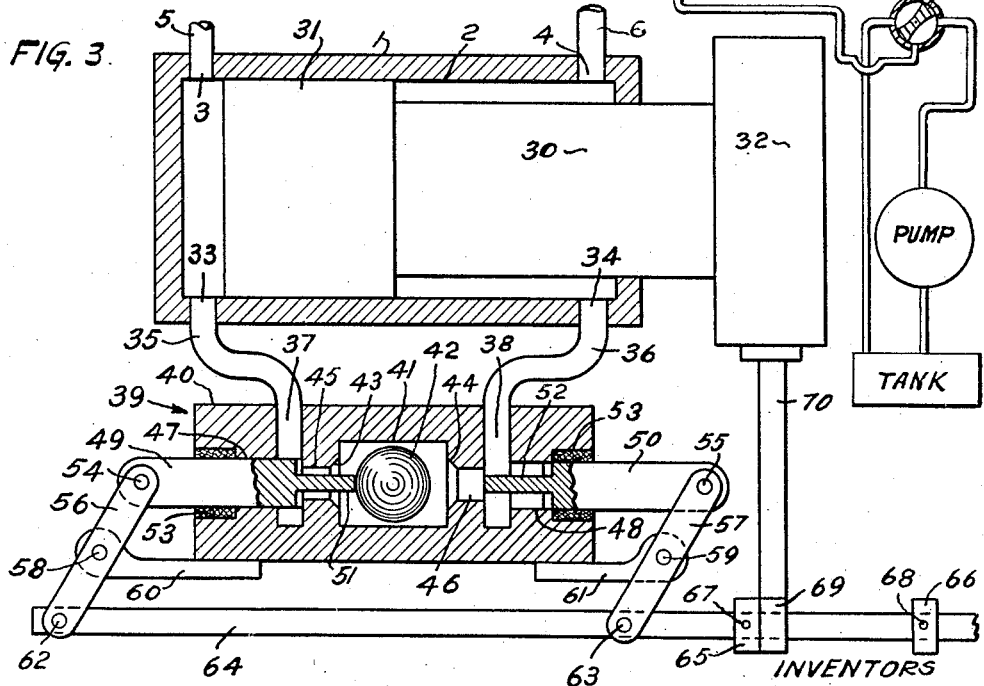
Figure 3 is a central vertical section through a hydraulic motor and a check valve outside of the motor, with a mechanical linkage provided for unseating the check valve when the motor piston reaches predetermined positions.

In the arrangement shown in Figure 3 the cylinder 1 contains the bore 2 with the ports 3 and 4 connected to the pipes 5 and 6, as before. Also provided is the piston 30, with a solid piston head 31 and platen 32. The cylinder 1 is also provided with ports 33 and 34, opening into pipes 35 and 36, which lead to ports 37 and 38 in a check valve, generally designated 39, and having a casing 40 with an internal bore 41 containing a ball 42. The bore 41 at its opposite ends is reduced in size, and provided with seats 43 and 44 opening into passageways 45 and 46. The opposite ends of the casing 40 are provided with bores 47 and 48, within which the plungers 49 and 50 reciprocate. These plungers are provided with projecting portions 51 and 52, respectively, these being smaller than the passageways 45 and 46 and adapted to pass loosely therethrough. Packings 53 prevent the escape of fluid around the plungers 49 and 50. The latter are pivotally connected, as at 54 and 55, to levers 56 and 57 pivotally mounted, as at 58 and 59, on the brackets 60 and 61 and having pivotal connections 62 and 63, with an operating rod 64. The latter is provided with movable stops 65 and 66, secured in position by means of the set screws 67 and 68, and adapted to be engaged by the end 69 of the platen arm 70 extending outwardly from the platen 32.

In the operation of the arrangement shown in Figure 3, to cause the platen 32 to execute a forward stroke, pressure fluid is admitted through the pipe 5 and port 3, into the space to the left of the piston head 31. The fluid continues through the port 33, pipe 35, port 37 and passageway 45, into the internal bore 41 of the check valve 39, causing the ball 42 to engage the seat 44, thereby obstructing the further passage of the fluid. The pressure fluid, accordingly, forces the piston head 31 and platen 32 to the right until the end 69 of the platen arm 70 engages the stop 66, and shifts the operating rod 64 to the right. This causes the lever 57 to move the plunger 50 to the left, unseating the ball 42 from its seat 44, and permitting fluid to by-pass through the check valve 39 from the pipe 35 to the pipe 36.

Similarly, when the direction of the pressure fluid is reversed so that it now enters the pipe 6 and port 4, the ball 42 is urged against the left-hand seat 43 by fluid reaching it through the port 34, the pipe 36, the port 38, the passageway 46 and the bore 41. The pressure fluid thus entrapped in the right-hand end of the cylinder 1 thereby forces the piston head 31 to the left until the end 69 of the platen 70 engages the stop 65, and moves the operating rod 64 to the left. This action operates the lever 56 to urge the plunger 49 to the right, unseating the ball 42 from the seat 43. Thereafter, the fluid is permitted to by-pass from one end of the cylinder to the other by way of the port 34, pipe 36, port 38, passageway 46, bore 41, passageway 45, port 37, pipe 35 and the port 33. In this manner the pressure fluid is by-passed freely between the opposite ends of the cylinder 1, at the extreme opposite ends of the stroke, thereby halting the platen 32 and causing the pump, or other means for providing pressure fluid, to force fluid through the system without the necessity of consuming much power.

The invention, therefore, enables a piston or plunger to be halted at predetermined positions at one or both of its stroke, and thereafter by-passes the fluid so that a great saving in power results without the necessity of pressure relief valves being employed to unload or by-pass the discharge of the pump. This device also eliminates the necessity of building up of pressure at one or both ends of the stroke to force the pump control to its neutral delivery position, if a variable delivery pump is employed.

It will be understood that we desire to comprehend within our invention such modifications as come within the scope of the claims and the invention.

Having thus fully described our invention, what we claim as new and desire to secure by Letters Patent, is:

1. In a hydraulic system, a piston rod, a piston head on said piston rod, a pressure fluid source, a cylinder having hydraulic connections to said fluid source on opposite sides of said piston head for receiving pressure fluid to operate said piston head, a passageway through said piston head having valve seats near its opposite ends, a single freely moveable ball valve member in said passageway engageable with said seats, said cylinder having stops mounted at opposite ends thereof to engage and unseat said ball valve member in response to the arrival of said piston at predetermined positions near the opposite ends of its stroke whereby to automatically shift said valve member to open said passageway and to maintain it in open position for a desired time to by-pass the pressure fluid from said fluid source through said piston head, and means for adjusting either of said stops to determine the position at which the opening of said ball valve occurs.

2. In a hydraulic system, a cylinder having hydraulic connections on opposite ends thereof, a piston head freely moveable in said cylinder, a pair of transversely spaced piston rods connected to either side of said piston head and a pair of platens associated with and arranged to be operated by said spaced piston rods, a centrally disposed passageway through said piston head having valve seats near its opposite ends, a single freely movable ball valve member in said passageway engageable with said seats, said cylinder having centrally disposed bores therethrough at its opposite ends, and threaded stops adjustably mounted in said threaded bores and operative to engage and unseat said ball valve member in response to the arrival of said piston at predetermined positions near the opposite ends of its stroke whereby to automatically shift said valve member to open said passageway.

WALTER ERNST.
GEORGE M. GEIGER.